No. 851,702. PATENTED APR. 30, 1907.
V. SPIETSCHKA.
ROTARY DRESSING DEVICE.
APPLICATION FILED AUG. 13, 1906.
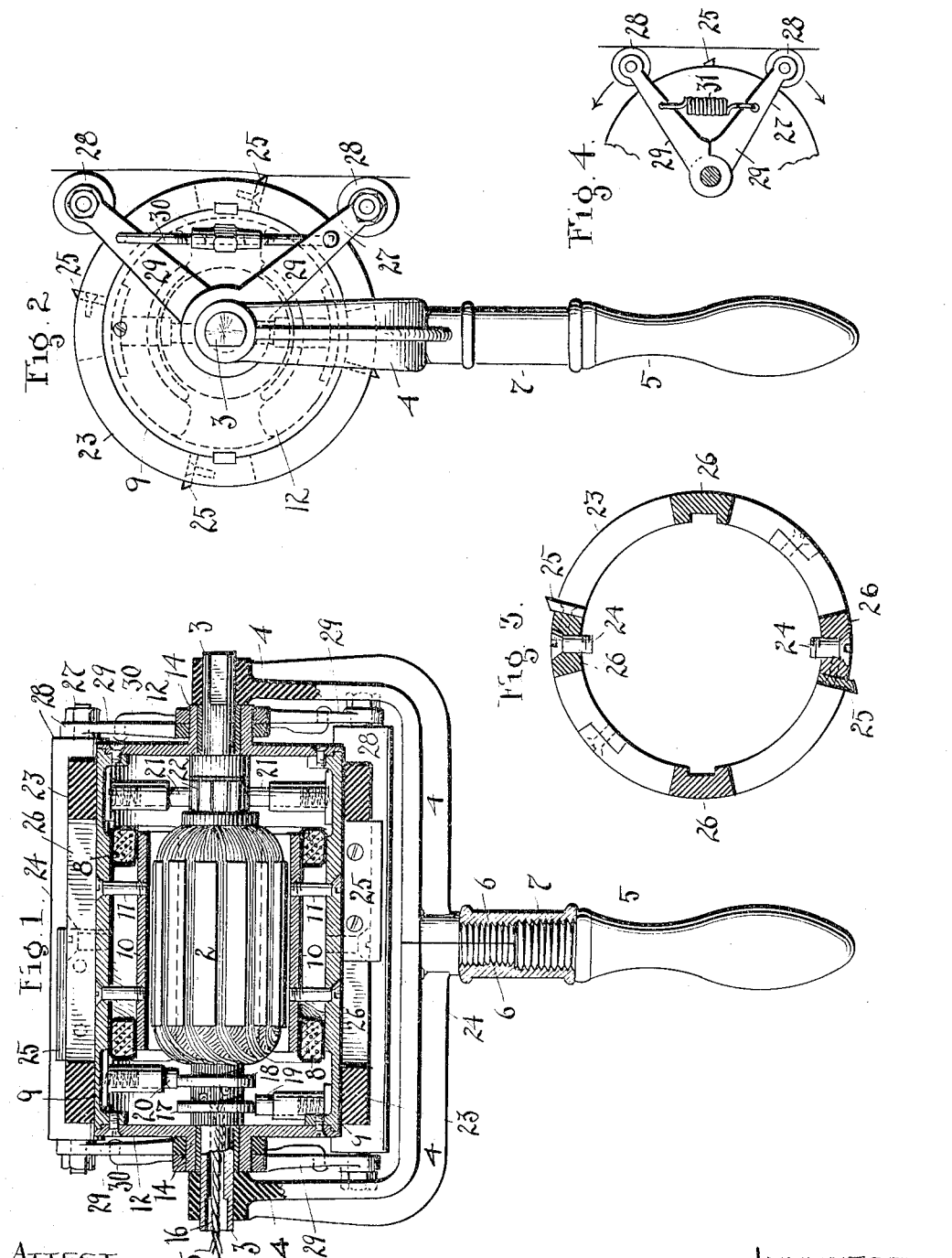

UNITED STATES PATENT OFFICE.

VINZENZ SPIETSCHKA, OF CLEVELAND, OHIO.

ROTARY DRESSING DEVICE.

No. 851,702.  Specification of Letters Patent.  Patented April 30, 1907.

Application filed August 13, 1906. Serial No. 330,321.

*To all whom it may concern:*

Be it known that I, VINZENZ SPIETSCHKA, a citizen of the United States, residing at Cleveland, in the county of Cuyahoga and State of Ohio, have invented certain new and useful Improvements in Rotary Dressing Devices; and I do declare that the following is a full, clear, and exact description of the invention, which will enable others skilled in the art to which it appertains to make and use the same.

My invention relates to rotary dressing devices, and the invention comprises the combination of parts all substantially as hereinafter described and more particularly pointed out in the claims.

The invention is an improvement in that class of motor driven dressing devices adapted to be held to their work by hand, and this particular device is especially adapted for planing, polishing and cleaning the curved walls of large tanks or vats, as well as floors or other flat surfaces which require evening or dressing.

In the accompanying drawings Figure 1 is a sectional view of my improved device on the longitudinal center thereof. Fig. 2 is an end view of the device as applied in use. Fig. 3 is a cross section of the removable cutter supporting ring. Fig. 4 is a view of the roller frame arms with a coiled spring between.

The device embodies an electric motor which in part comprises a stationary armature 2 having its shaft ends 3 splined or otherwise fixed within the ends of arms 4 of handle 5. Arms 4 are separate right angled pieces having each a semi-circular threaded extension 6 adapted to be brought together and held as one by a threaded sleeve 7 mounted upon handle 5.

The field coils 8 of the electric motor encircle armature 2 and are mounted upon the inner wall of cylindrical casing 9 by field pieces 10 which are screwed into place thereon by screws 11. Casing 9 has end plates 12 with bushed hubs 14 which rotate upon armature shaft ends 3 at the side of handle arms 4. Electrical connections 15 for the motor extend from the outside through bore 16 in shaft end 3 at the left of the device and connect with contact rings 17 and 18 respectively on the said shaft end. Carbon brushes 19 and 20, respectively, convey the current to the fields with which they are connected and other brushes 21 at the right of the device contact with commutator 22 and complete the electrical circuit connections within the motor.

Casing 9 revolves and becomes the motor driven part, and upon this casing I mount a suitable dressing tool or instrument, which in this instance is shown as a cutter ring 23 slidably splined lengthwise upon casing 9 and detachably secured in place thereon by screws 24. Ring 23 has a series of cutting blades 25 screwed upon its ribs or bars 26 extending from end to end thereof and these blades may be staggered in respect to each other to provide an overlapping cut or inclined to the axis to give a shearing cut or they may be substituted by brushes, sand paper parts or other suitable polishing elements (not shown). In fact, as ring 23 is removable, any other ring of like proportion having other dressing instruments, such as buffing tools, may be interchanged therefor. To this end, handle arms 4 are separable to give a knockdown structure adapted to permit interchange of parts, especially of ring 23, although said ring may be made of separable portions as in Fig. 3 to permit its removal without disturbing the other parts.

The depth of cut or degree of contact between the dressing instrument of the device and the surface worked upon is established and maintained by a guide frame 27 comprising a pair of parallel rollers 28 carried by sets of diverging arms 29 located at each side of casing 9, and which arms are mounted free upon hubs 14 and are adjustably held in fixed relationship to each other and to the dressing tools by a turnbuckle connection 30. The working plane of the cutters may be changed at will by changing the angular relation between opposite arms 29, and this is done by adjusting turnbuckle connection 30. Either handle 5 or the roller supporting frame 27 may be swung to one side or another of the axial center of the device as may be found most convenient in applying the device to its work. Or the device can be turned end for end to cut in either direction.

A rigid one piece handle support may be substituted for arms 4 but handle 5 is preferably removably engaged with such support as it is often desirable and necessary to use longer handles.

In place of turnbuckle connection 30, I might employ a coiled spring 31, see Fig. 4, to hold arms 29 in yielding relation and whereby the depth of cut may be governed by pressure as applied to the device through the handle

What I claim is:—

1. A rotary dressing device comprising a motor armature and shaft and a divided handle in the arms of which said shaft is fixed, in combination with a revolving field carrying cylinder mounted at its ends on said shaft, dressing instruments fixed thereon and means to regulate the cut of said instruments.

2. In a rotary dressing device, a motor armature and a double armed handle in which said armature is mounted, in combination with motor fields and a rotatable casing therefor mounted at its ends on the axis of the armature and a dressing member removably supported upon said casing, said member having a dressing portion running parallel with the surface of said casing lengthwise.

3. In a rotary dressing device, a motor driven casing and a supporting handle in which said casing is mounted, a dressing instrument removably secured upon the outside of said casing, and an adjustable guide-frame adapted for variable setting of said dressing instrument to the work provided with two arms at each end and adapted to rest upon the work both in front and behind the said dressing instrument at the ends thereof.

4. In a rotary dressing device, a double armed handle support and a motor driven casing rotatably mounted therein, a dressing tool removably secured upon the periphery of said casing and a swinging guide frame comprising rollers and adjusting parts adapted to set said dressing tool to the work, said frame having two diverging arms at each end of said cylinder provided with said rollers in their ends and mounted about the axis of said cylinder.

5. In a rotary dressing device, a motor armature and a double armed handle affixed thereto, a rotatable casing having motor fields and contact members mounted in said casing, a dressing tool carrier removably secured upon said casing, and a swinging guide frame for said device having its bearings at each end thereof and outside the path of said casing.

6. In a rotary dressing device, the motor comprising the fixed armature, the revolving fields and current conveying parts and a rotatable support for said fields and double armed handle in which said parts are supported, in combination with a dressing tool removably mounted upon said rotatable support, and a roller guide frame comprising diverging arms at each end and adjustable connections adapted to set said dressing tool to the work.

7. In a rotary dressing device, a motor comprising a stationary armature and rotatable fields and a two armed handle in which said armature is mounted, in combination with a cylindrical casing for said fields, a removable ring about said casing and cutters removably secured to said ring, and a guide-frame comprising diverging arms and rollers thereon with an adjustable connection therefor adapted to set said dressing tools to the work.

In testimony whereof I sign this specification in the presence of two witnesses.

VINZENZ SPIETSCHKA.

Witnesses:—
R. B. Moser,
C. A. Sell.